US009964425B2

(12) United States Patent
Kim et al.

(10) Patent No.: US 9,964,425 B2
(45) Date of Patent: May 8, 2018

(54) SYSTEM FOR MONITORING COASTAL UNDERGROUND WATER

(75) Inventors: Yongcheol Kim, Daejeon (KR); Yoon Sung Hee, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 629 days.

(21) Appl. No.: 13/699,715

(22) PCT Filed: May 25, 2012

(86) PCT No.: PCT/KR2012/004176
§ 371 (c)(1),
(2), (4) Date: Nov. 24, 2012

(87) PCT Pub. No.: WO2013/162116
PCT Pub. Date: Oct. 31, 2013

(65) Prior Publication Data
US 2013/0289878 A1 Oct. 31, 2013

(30) Foreign Application Priority Data
Apr. 26, 2012 (KR) .................. 10-2012-0043743

(51) Int. Cl.
*G01F 23/00* (2006.01)
*G01F 23/68* (2006.01)
*G01F 23/76* (2006.01)

(52) U.S. Cl.
CPC .......... *G01F 23/0038* (2013.01); *G01F 23/68* (2013.01); *G01F 23/76* (2013.01)

(58) Field of Classification Search
CPC ...... G01F 23/0038; G01F 23/68; G01F 23/76; G01F 23/14
See application file for complete search history.

(56) References Cited

U.S. PATENT DOCUMENTS 5,791,187 A * 8/1998 Chang .................. G01C 13/008
73/290 R
2001/0000851 A1* 5/2001 Morimoto ................... 73/304 C
(Continued)

FOREIGN PATENT DOCUMENTS

KR 10-2010-0030340 * 3/2010
KR 1020100030340 A 3/2010
(Continued)

OTHER PUBLICATIONS

Machine Translation of Jeong KR10-2010-0030340.*
(Continued)

*Primary Examiner* — Alexander Satanovsky
*Assistant Examiner* — Mark Crohn
(74) *Attorney, Agent, or Firm* — Fredrikson & Byron, P.A.

(57) ABSTRACT

A system for monitoring coastal underground water is disclosed. The system includes a freshwater/saltwater interface position tracking device that is inserted into an observation well used for observing coastal underground water and can move on a freshwater/saltwater interface according to a change of buoyancy; and a first measuring sensor that is inserted into the observation well so as to be placed at a position above the freshwater/saltwater interface position tracking device and has a distance measuring unit used for measuring a first distance between the freshwater/saltwater interface position tracking device and the first measuring sensor, wherein the first measuring sensor has a first signal output unit used for outputting a signal indicative of the measured first distance.

6 Claims, 14 Drawing Sheets

(56) References Cited

U.S. PATENT DOCUMENTS

2002/0064090 A1\* 5/2002 Su .................................. 367/99
2010/0198547 A1\* 8/2010 Mulligan ............ E21B 41/0007
                                                                                             702/100

FOREIGN PATENT DOCUMENTS

| KR | 10-0977155 | \* | 8/2010 |
| KR | 1020110092952 A | | 8/2011 |
| KR | 10-1177318 | \* | 8/2012 |

OTHER PUBLICATIONS

Machine Translation of Kim KR10-0977155.\*
Machine Translation of Infor World Co. Ltd. KR10-1177318 (Pub. No. KR10-2010-0012679.\*
Lindeburg, Michael, Civil Engineering Reference Manual for the PE Exam (13th ed. 2012).\*
Grove, T., et al., Determining dielectric constants using a parallel plate capacitor (Am J. Phys. 73(1), Jan. 2005).\*

\* cited by examiner

SYSTEM FOR MONITORING COASTAL UNDERGROUND WATER

RELATED APPLICATIONS

This application is a 35 U.S.C. 371 national stage filing from International Application No. PCT/KR2012/004176 filed May 25, 2012 and claims priority to Korean Patent Application No. 10-2012-0043743, filed on Apr. 26, 2012, the teachings of which are incorporated herein by reference.

TECHNICAL FIELD

The present invention relates to a system for monitoring coastal underground water.

BACKGROUND ART

Generally, due to excessive use of underground water in a coastal area, the underground water level descends and this causes saltwater (sea water) to intrude into the underground water and contaminates the underground water so that the underground water in the coastal area may not be used as agricultural water or industrial water, let alone drinking water.

Therefore, in such a coastal area, underground water observation wells are typically used. To form such an underground water observation well, an observation well is drilled and a wire or wireless sensor for measuring the water level, the temperature and the electrical conductivity of the underground water is installed in the observation well so as to monitor a change of the properties of the underground water.

The freshwater/saltwater interface (the interface between underground water and saltwater) may vary according to two mechanisms. First, the interface may vary according to a reduction in the thickness of a freshwater layer. Second, the interface may vary according to a change of the thickness of a saltwater layer.

The thickness of the freshwater layer may increase by recharge of rainfall or may decrease (become thin) by water pumping in an area around the freshwater.

The thickness of the saltwater layer varies according to a periodical variation in the height of the sea water surface that varies by the rising and falling of the tide.

In recent years, the sea water surface has gradually risen as a result of the global warming phenomenon.

When the thickness of the freshwater layer becomes thin and the thickness of the saltwater layer becomes thick compared to a reference point according to various phenomena, the freshwater/saltwater interface rises. In contrast, when the thickness of the freshwater layer becomes thick and the thickness of the saltwater layer becomes thin, the freshwater/saltwater interface falls.

As described above, according to various and complex phenomena, such as the pumping of excessive amounts of underground water, the recharge of rainfall, the rising and falling of the tide and the rising of the sea water surface by global warming, the location of the freshwater/saltwater interface may vary at any time.

However, the measuring sensor that is installed in the underground water observation well of the coastal area is located at a fixed depth regardless of wire or wireless type so that the sensor may not determine the precise location of the freshwater/saltwater interface in real time. Although the sensor determines the location of the freshwater/saltwater interface in real time, the sensor cannot monitor a change of the freshwater lens thickness or a change of the freshwater/saltwater interface depth in real time so that see wate may infiltrate into the underground water or coastal aquifer.

SUMMARY OF THE INVENTION

The present invention, in some of its various embodiments, has been made keeping in mind the above problems occurring in the related art, and is intended to provide a system in which a freshwater/saltwater interface position tracking device and a distance measuring sensor are placed in freshwater so as to measure a distance between the freshwater/saltwater interface position tracking device and the measuring sensor and measure a distance between an underground water surface and the measuring sensor, thereby measuring a change of a freshwater lens thickness or a change of a freshwater/saltwater interface depth in real time, so that when there may be a danger of sea water intrusion in a coastal aquifer, the system can raise an alarm for restricting the use of underground water.

In an embodiment of the present invention, a system for monitoring coastal underground water is provided, including: a freshwater/saltwater interface position tracking device that is inserted into and floating on or at the freshwater/saltwater interface in an observation well used for observing coastal underground water and can move upward and downward along with the freshwater/saltwater interface according to a change of buoyancy; and a first measuring sensor that is inserted into the observation well so as to be placed at a position above the freshwater/saltwater interface position tracking device and has a distance measuring unit used for measuring a first distance between the freshwater/saltwater interface position tracking device and the first measuring sensor, wherein the first measuring sensor has a first signal output unit used for outputting a signal indicative of the measured first distance.

In some embodiments of the present invention, the first measuring sensor may include a water pressure measuring unit used for measuring a water pressure.

In some embodiments of the present invention, the monitoring system may further include: a second measuring sensor inserted into the observation well so as to be placed in air.

In some embodiments of the present invention, the distance measuring unit may include a sound wave generator and a sound wave receiver or a laser generator and a laser receiver.

In some embodiments of the present invention, the second measuring sensor may include an atmospheric pressure measuring unit used for measuring atmospheric pressure.

In some embodiments of the present invention, the second measuring sensor may include a second signal output unit used for outputting data of the measured atmospheric pressure.

In some embodiments of the present invention, the monitoring system may further include: a monitor used for monitoring a freshwater lens thickness or a freshwater/saltwater interface depth using both data outputted from the first signal output unit and data outputted from the second signal output unit.

In some embodiments of the present invention, the monitor may include an alarm unit used for raising an alarm when the freshwater lens thickness is less than a preset value or the freshwater/saltwater interface depth is greater than the reference preset value.

In another embodiment of the present invention, a system for monitoring coastal underground water is provided, including: a freshwater/saltwater interface position tracking device that is inserted into an observation well used for observing coastal underground water and can move on or with a freshwater/saltwater interface according to a change of buoyancy; a first measuring sensor that is inserted into the observation well so as to be placed at a position above the freshwater/saltwater interface position tracking device and includes a distance measuring unit used for measuring a first distance between the freshwater/saltwater interface position tracking device and the first measuring sensor and includes a water pressure measuring unit used for measuring water pressure; a second measuring sensor including an atmospheric pressure measuring unit used for measuring atmospheric pressure; a water surface measuring sensor used for measuring an underground water surface; and a monitor that includes: a data base used for storing data measured by the first measuring sensor, data measured by the second measuring sensor and data measured by the water surface measuring sensor; a data operation unit used for operating the data stored in the data base; a compare unit used for comparing a value operated by the data operation unit with a preset value; and an alarm unit used for raising an alarm when the compare unit determines that the value operated by the data operation unit is less than the preset value.

In some embodiments of the present invention, the data operation unit may determine a second distance between the underground water surface and the first measuring sensor by compensating the underground water surface, which was measured by the water surface measuring sensor, using both the water pressure measured by the water pressure measuring unit of the first measuring sensor and the atmospheric pressure measured by the second measuring sensor, and may determine a freshwater lens thickness by adding the first distance to the second distance.

In a further embodiment, the present invention provides a method of monitoring coastal underground water using a coastal underground water monitoring system, the system including: a freshwater/saltwater interface position tracking device that is inserted into an observation well used for observing coastal underground water and can move on or with a freshwater/saltwater interface according to a change of buoyancy; and a first measuring sensor that is inserted into the observation well so as to be placed at a position above the freshwater/saltwater interface position tracking device and has a distance measuring unit used for measuring a first distance between the freshwater/saltwater interface position tracking device and the first measuring sensor, wherein the first measuring sensor has a first signal output unit used for outputting a signal indicative of the measured first distance, the monitoring method including: a first distance measuring step of measuring the first distance between the first measuring sensor and the freshwater/saltwater interface position tracking device; a signal outputting step of outputting a signal indicative of the measured first distance to a monitor by the first signal output unit after the first distance measuring step; and a monitoring step of monitoring a change of a freshwater lens thickness or a change of a freshwater/saltwater interface depth using transmitted data.

In still another embodiment, the present invention provides a method of monitoring coastal underground water using a coastal underground water monitoring system, the system including: a freshwater/saltwater interface position tracking device that is inserted into an observation well used for observing coastal underground water and can move on or with a freshwater/saltwater interface according to a change of buoyancy; a first measuring sensor that is inserted into the observation well so as to be placed at a position above the freshwater/saltwater interface position tracking device and has a distance measuring unit used for measuring a first distance between the freshwater/saltwater interface position tracking device and the first measuring sensor and has a water pressure measuring unit used for measuring water pressure; a second measuring sensor that has an atmospheric pressure measuring unit used for measuring atmospheric pressure; a water surface measuring sensor used for measuring an underground water surface; and a monitor that includes: a data base used for storing data measured by the first measuring sensor, data measured by the second measuring sensor and data measured by the water surface measuring sensor; a data operation unit used for operating the data stored in the data base; a compare unit used for comparing the value operated by the data operation unit with a preset value so as to determine whether the operated value is less that the preset value; and an alarm unit used for raising an alarm when the compare unit determines that the operated value is less than the preset value, the monitoring method including: an underground water surface measuring step of measuring the underground water surface using the water surface measuring sensor; a first distance and water pressure measuring step of measuring the first distance between the first measuring sensor and the freshwater/saltwater interface position tracking device and measuring the water pressure; an atmospheric pressure measuring step of measuring the atmospheric pressure using the atmospheric pressure measuring unit of the second measuring sensor; a data storing step of storing the measured data in the data base; and an operating step of compensating a distance between the underground water surface and the first measuring sensor using both the atmospheric pressure and the water pressure and of adding the distance to the first distance, thereby determining a freshwater lens thickness.

In some of its various embodiments, the system and method for monitoring coastal underground water of the present invention is advantageous in that it can observe the freshwater/saltwater interface in real time and measure a change of the freshwater lens thickness or a change of the depth of the freshwater/saltwater interface so that, when there may be a danger of sea water intrusion in a coastal aquifer, the system can raise an alarm for restricting the use of underground water, thereby easily managing the coastal underground water.

DETAILED DESCRIPTION

Figure 1:
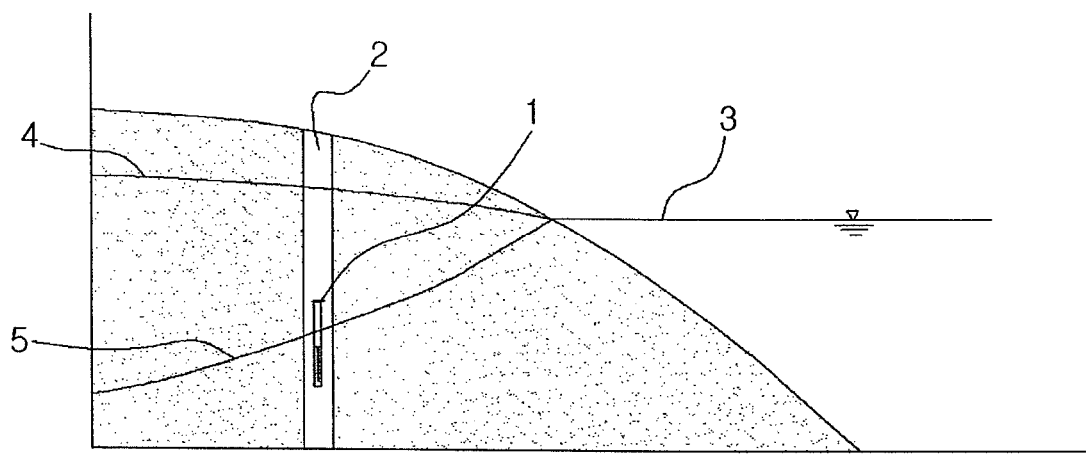
FIG. 1 is a view schematically illustrating a freshwater/saltwater interface position tracking device that is installed in an underground water observation well according to the present invention.

Hereinbelow, non-limiting, illustrative embodiments and preferred embodiments of the present invention will be described in detail with reference to the accompanying drawings. Wherever possible, the same reference numerals will be used throughout the drawings and the description to refer to the same or like parts. In the following description, it is to be noted that, when the functions of conventional elements and the detailed description of elements related with the present invention may make the gist of the present invention unclear, a detailed description of those elements will be omitted.

Figure 2:
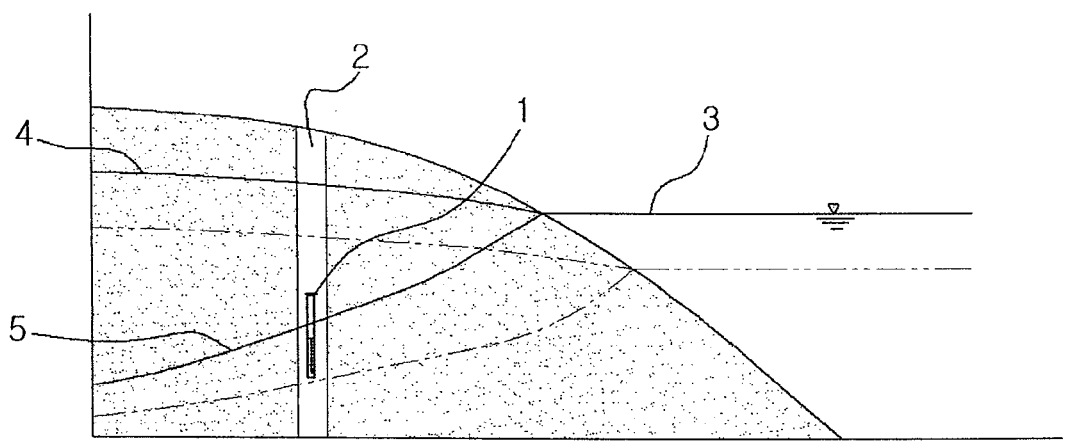
FIG. 2 is a view schematically illustrating the operation of the freshwater/saltwater interface position tracking device that is installed in the underground water observation well according to the present invention.
Figure 3:
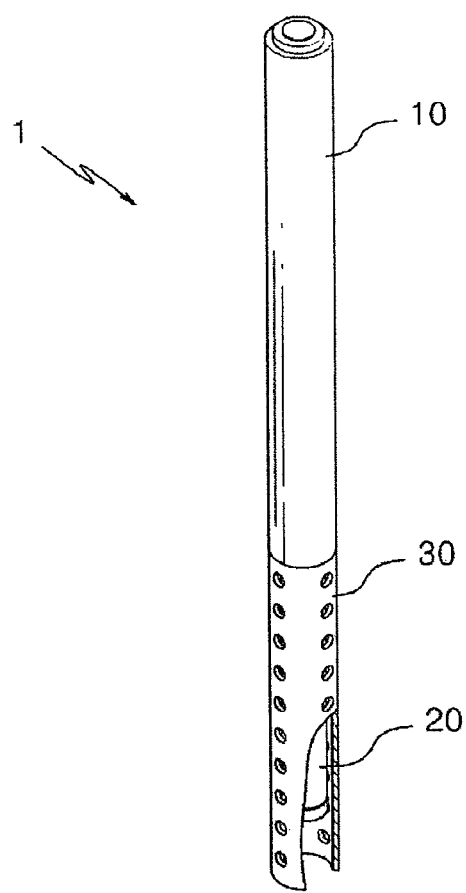
FIG. 3 is a perspective view of the freshwater/saltwater interface position tracking device that is used in the present invention.

As shown in FIG. 2, a freshwater/saltwater interface position tracking device 1 that is used to track the interface between freshwater and saltwater according to the present invention is installed in an underground water observation well 2 that is drilled in a coastal area so as to monitor a change of underground water, so that the freshwater/saltwater interface position tracking device can move upwards or downwards according to a change of the interface between underground freshwater and saltwater. As shown in FIGS. 3 through 8, the freshwater/saltwater interface position tracking device 1 includes a buoyancy inducing unit 10 that controls buoyancy using a fluid, a wireless measuring sensor 20 that is installed at a location below the buoyancy inducing unit 10 and measures the water level, the temperature and the electrical conductivity of underground water, and a perforated pipe 30 that surrounds the wireless measuring sensor 20 at the location below the buoyancy inducing unit 10.

The buoyancy inducing unit 10 includes a buoyant body 11 that has a tubular structure. This tubular buoyant body 11 is closed in the lower end thereof, and has an inner chamber 11a for containing a fluid therein and an opening part 11b that is formed in the upper end of the body 11 so as to introduce the fluid into the chamber 11a. In the lower end of the buoyant body 11, a bracket 12 that has a mounting slit 12a for holding the wireless measuring sensor 20 is formed and an internally threaded part 13 is formed around the bracket 12 so as to connect the perforated pipe 30 to the buoyant body 10. In the upper end of the buoyant body 11, a sealing cap 14 is provided so as to close the opening part 11b when the fluid has been contained in the inner chamber 11a. The sealing cap 14 includes a variable metal part 15 that is attracted to a magnet.

Figure 5:
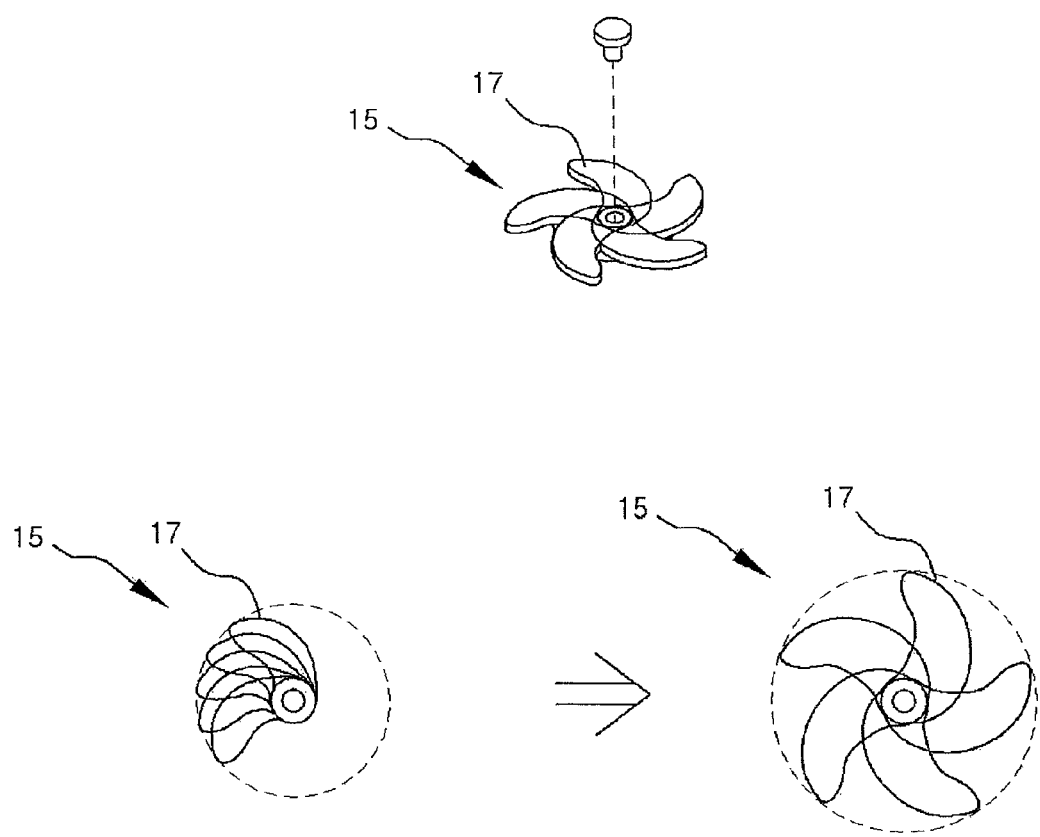
FIG. 5 is a view schematically illustrating a variable metal part of the freshwater/saltwater interface position tracking device according to the present invention.

As shown in FIG. 5, the variable metal part 15 is configured in such a way that metal blades 17 can be opened circumferentially, thereby increasing or reducing the size of the metal part 15.

However, the structure of the variable metal part 15 is not limited to the above-mentioned structure, but may be altered to realize the size-variable structure in such a way that metal parts having different sizes are selectively attached to the sealing cap 14 or first metal parts are attached to the sealing cap 14 and second metal parts having a size larger than that of the first metal parts are circumferentially attached to the first metal parts.

Due to the variable metal part 15 that is attached to the sealing cap 14, the freshwater/saltwater interface position tracking device 1 can be installed in or recovered from the underground water observation well 2 using an electromagnet. Here, in order to recover the freshwater/saltwater interface position tracking device 1 from the observation well 2 using an electromagnetic force, it is required to precisely place the electromagnet at a location above the variable metal part 15.

In this case, when the diameter of the variable metal part 15 is excessively smaller than that of the underground water observation well 2, the electromagnet may not be precisely placed at a desired location above the variable metal part 15 so that it is difficult to recover the freshwater/saltwater interface position tracking device 1 from the underground water observation well 2. Accordingly, in order to easily recover the freshwater/saltwater interface position tracking device 1 from the underground water observation well 2 regardless of the location of the electromagnet in the underground water observation well 2, it is required to make the diameter of the variable metal part 15 be slightly smaller than that of the underground water observation well 2.

Here, the variable metal part 15 may be mounted to the sealing cap 14 using a locking screw. Alternatively, the variable metal part 15 may be provided with an externally threaded protrusion so that the externally threaded protrusion of the variable metal part 15 can be tightened to an internally threaded part that is formed in the upper end of the sealing cap 14.

Further, the opening part 11b and the sealing cap 14 have respective threads. After controlling the buoyancy by introducing the fluid 40 into the inner chamber 11a through the opening part 11b, the sealing cap 14 is tightened to the opening part 11b. Here, a sealing rubber packing 16 is interposed between the opening part 11b and the sealing cap 14, thereby sealing the opening part 11b.

The wireless measuring sensor 20 may use a conventional sensor that can measure the water level, the temperature and the electrical conductivity of underground water in the coastal area. Here, the wireless measuring sensor 20 measures a change of the underground water and wirelessly outputs a signal to a recording device that is installed on the ground, thereby allowing a worker on the ground to know of a change in the position of the freshwater/saltwater interface.

Figure 4:
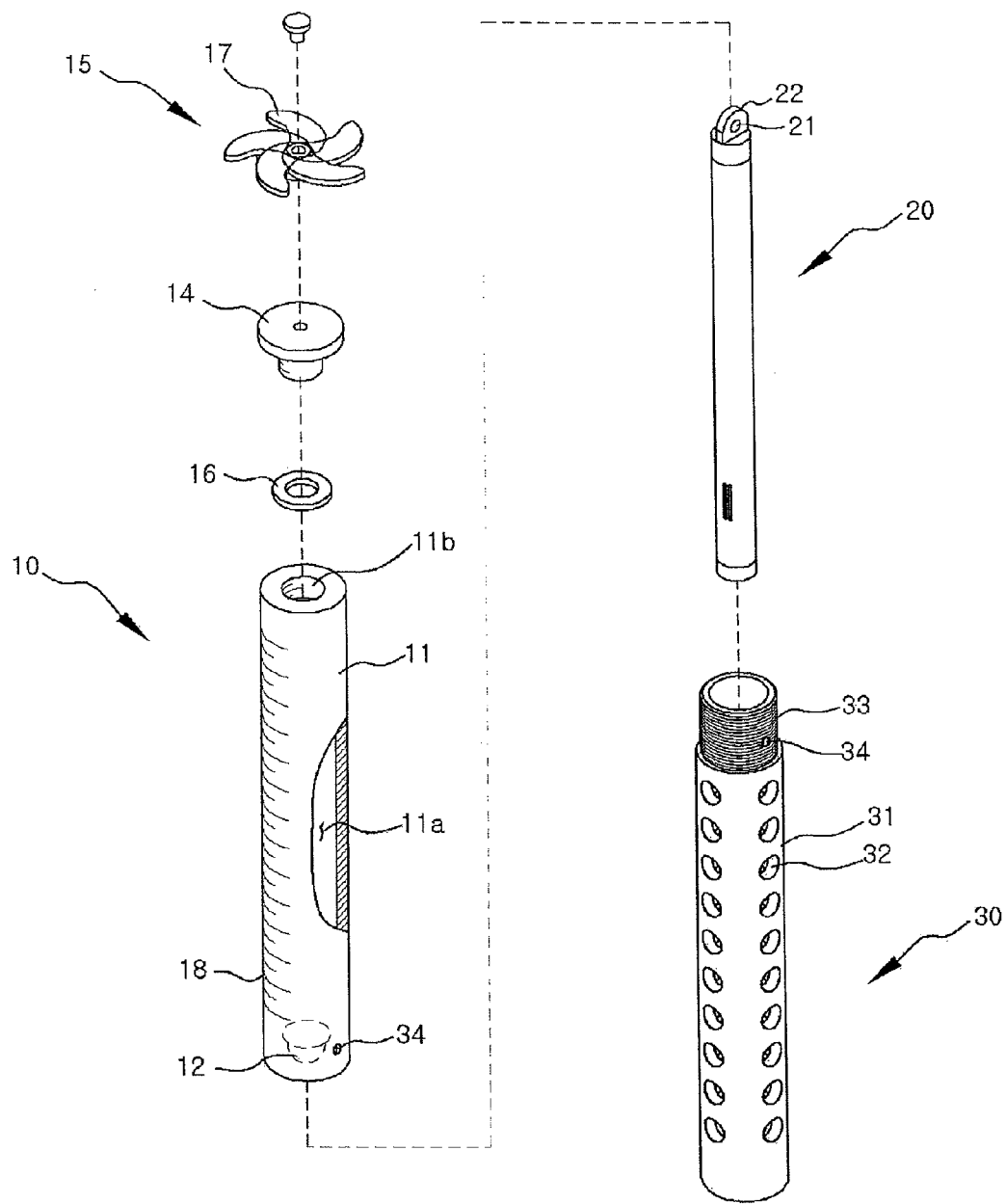
FIG. 4 is an exploded perspective view of the freshwater/saltwater interface position tracking device that is used in the present invention.

As shown in FIG. 4, the above-mentioned wireless measuring sensor 20 is provided with a connector 21 in an upper end thereof. The connector 21 of the sensor 20 has a through-hole 22 so that the connector 21 can be connected to the bracket 12 of the buoyancy inducing unit 10.

Figure 6:
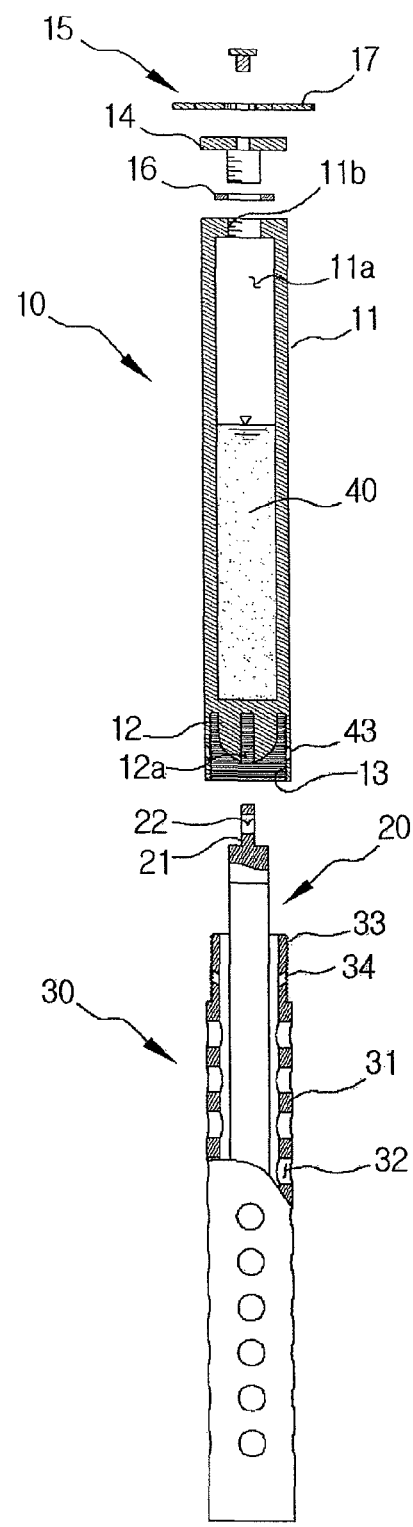
FIG. 6 is an exploded sectional view of the freshwater/saltwater interface position tracking device according to the present invention.

As shown in FIG. 6, in order to connect the wireless measuring sensor 20 to the lower end of the buoyancy inducing unit 10, the connector 21 of the wireless measuring sensor 20 is inserted into the mounting slit 12a of the bracket 12 of the buoyancy inducing unit 10 in such a way that the through-hole 22 of the connector 21 is aligned with through-holes of the bracket 12 prior to inserting a pin into the aligned through-holes.

The perforated pipe 30 surrounds the wireless measuring sensor 20, thereby protecting the sensor 20. As shown in FIG. 4, the perforated pipe 30 can introduce both underground water and saltwater to the wireless measuring sensor 20 that is placed in the perforated pipe 30.

Figure 7:
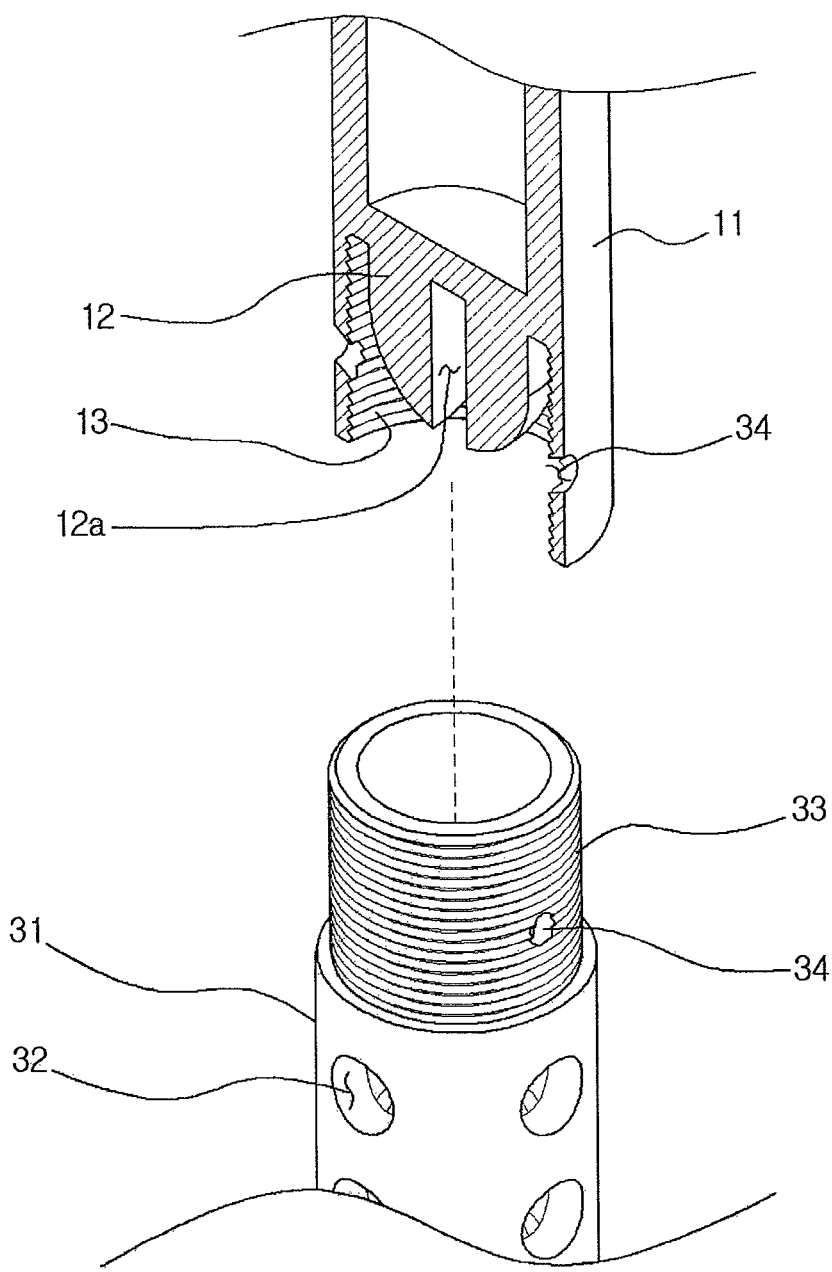
FIG. 7 is an enlarged view illustrating an air outlet hole of the freshwater/saltwater interface position tracking device according to the present invention.

As shown in FIGS. 6 and 7, a plurality of inlet holes 32 are formed through the sidewall of the perforated body 31 so that underground water and saltwater can flow into the perforated body 31 through the inlet holes 32 and can come into contact with the wireless measuring sensor 20 that is placed in the perforated body 31. Here, the outer circumferential surface of the upper end of the perforated body 31 is externally threaded, thereby forming an externally threaded part 33. The externally threaded part 33 of the perforated body 31 can be tightened to the internally threaded part 13 that is formed in the lower end of the buoyant body 11.

Here, the inlet holes 32 are arranged in the sidewall of the perforated body 31 along axial directions.

When the freshwater/saltwater interface position tracking device 1 is inserted into the underground water observation well 2, both underground water and saltwater flow into the perforated body 31 through inlet holes 32 that are formed in a lower part of the perforated body 31, while air that has remained in the perforated body 31 is discharged from the perforated body 31 through inlet holes 32 that are formed in an upper part of the perforated body 31.

Here, a very small space is defined in a tightened junction between the externally threaded part 33 that is formed in the upper end of the perforated body 31 and the internally threaded part 13 that is formed in the lower end of the buoyant body 11 and air may remain in the very small space and may exercise an influence on the buoyancy.

To expel a very small amount of air that has remained in the upper part of the perforated body 31 to the outside and thereby to realize a precise change of buoyancy according to a change of the freshwater/saltwater interface, respective air outlet holes 34 are formed both in the externally threaded part 33 and in the internally threaded part 13 at corresponding positions.

Accordingly, when the externally threaded part 33 is tightened to the internally threaded part 13, the air outlet holes 34 of the externally threaded part 33 can communicate with the air outlet holes 34 of the internally threaded part 13 so that the very small amount of air that has remained in the upper part of the perforated body 31 can be completely discharged to the outside through the air outlet holes 34.

Figure 8:
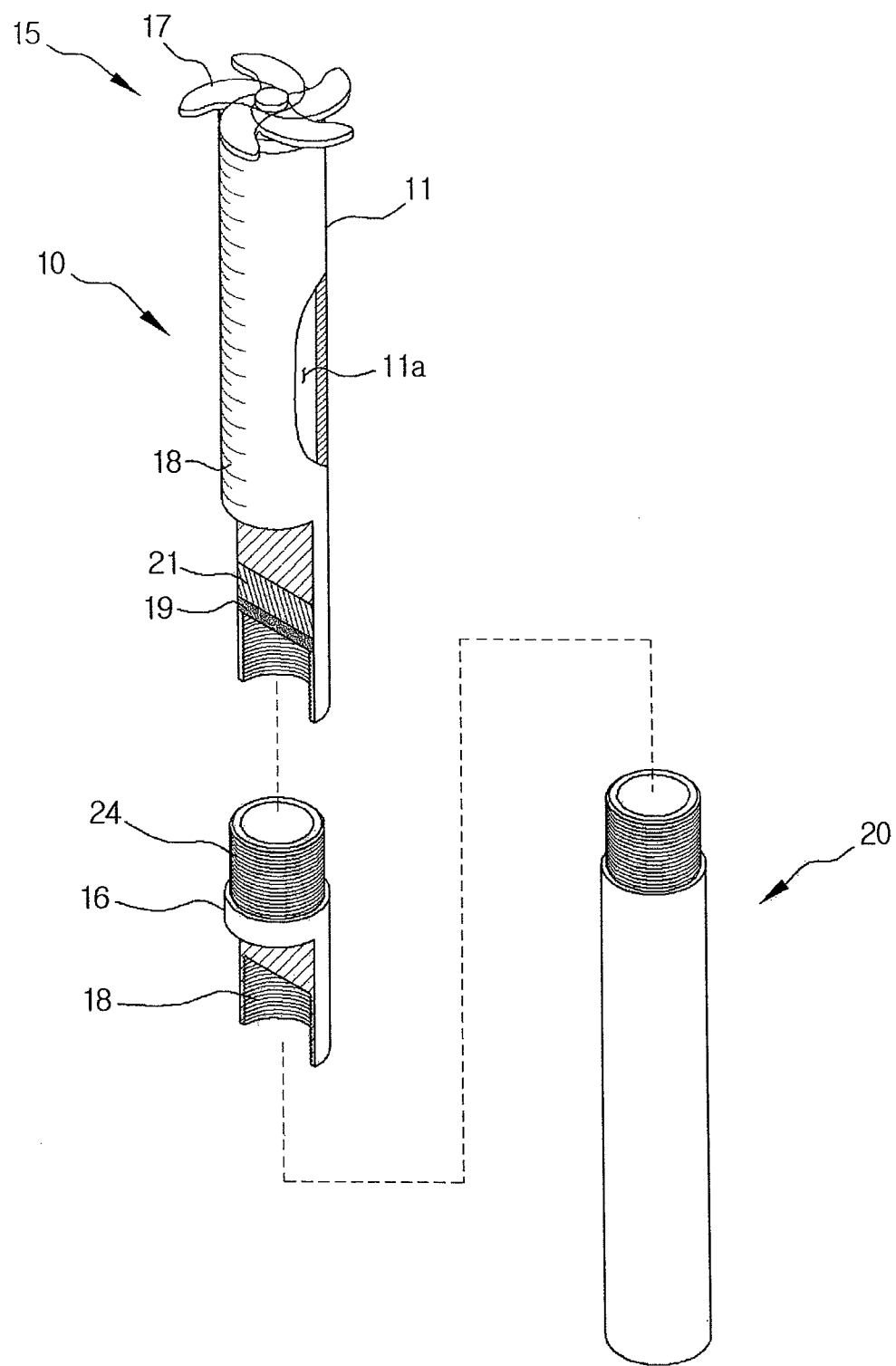
FIG. 8 is a view illustrating a freshwater/saltwater interface position tracking device according to another embodiment of the present invention.

FIG. 8 is a view illustrating another embodiment of the freshwater/saltwater interface position tracking device 1 according to the present invention.

In this embodiment, the perforated pipe 30 may be detachably mounted so that the pipe 30 surrounds the outer surface of the wireless measuring sensor 20 and protects the sensor 20. Alternatively, the wireless measuring sensor 20 may be used in a state in which the sensor 20 is directly mounted to the buoyancy inducing unit 10 without using such a perforated pipe 30.

Here, the outer circumferential surface of the upper end of the wireless measuring sensor 20 may be externally threaded so that the connector 21 can be tightened to the externally threaded upper end of the sensor 20 through screw-type tightening.

Alternatively, the outer circumferential surface of the upper end of the wireless measuring sensor 20 having no connector 21 may be externally threaded so that the externally threaded upper end of the sensor 20 can be connected to an internally threaded lower end of the buoyancy inducing unit 10 through screw-type connecting.

FIG. 8 illustrates an example of the above-mentioned altered embodiment. As shown in the drawing, the wireless measuring sensor 20 may have various shapes and sizes. Here, the diameter of the outer circumferential surface of the sensor 20 may be various according to the size thereof so that connector 16 is used to connect the sensor 20 having various shapes and sizes to the buoyancy inducing unit 10 having a fixed size.

Here, first threads 24 are formed around the outer circumferential surface of the upper end of the connector 16, and second threads 18 are formed around the inner circumferential surface of the lower end of the connector 16 so that the second threads 18 can be tightened to the threads that are formed around the upper end of the wireless measuring sensor 20 and the first threads 24 can be tightened to the threads that are formed around the inner circumferential surface of the lower end of the buoyant body 11 of the buoyancy inducing unit 10, thereby connecting the wireless measuring sensor 20 to the buoyancy inducing unit 10.

Here, the diameter of the second threads 18 of the connector 16 may be various according to the size of the wireless measuring sensor 20, and the diameter of the first threads 24 is fixed according to the diameter of the inner circumferential surface of the lower end of the buoyant body 11.

As shown in FIG. 8, the buoyancy inducing unit 10 is formed by the buoyant body 11 that has a tubular structure in which the lower end is closed, with the inner chamber 11a being defined in the buoyant body 11 so as to contain a fluid therein and the opening part 11b being formed in the upper end of the buoyant body 11 so as to introduce the fluid into the chamber 11a. The inner circumferential surface of the lower end of the buoyant body 11 is internally threaded so as to hold the wireless measuring sensor 20. Here, in order to prevent leakage of the fluid that may be generated through the threads which are formed in the closed lower end of the tubular buoyant body 11, a sealing member 19 is provided in the lower end of the inner chamber 11a so as to isolate the inner chamber 11a from the threads, thereby sealing the inner chamber 11a.

Figure 9:
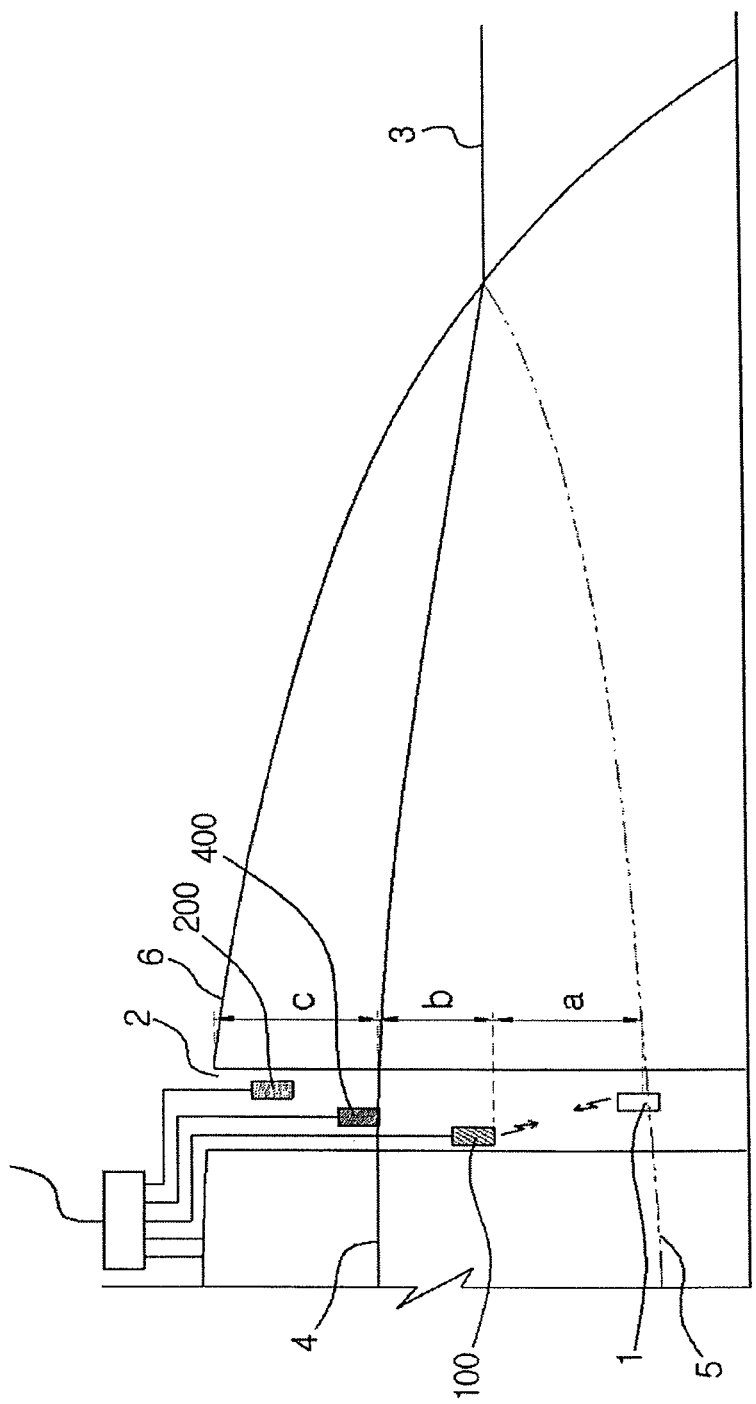
FIG. 9 is a view schematically illustrating a system for monitoring coastal underground water according to the present invention.

FIG. 9 is a view schematically showing the system for monitoring coastal underground water according to the present invention.

Figure 10:
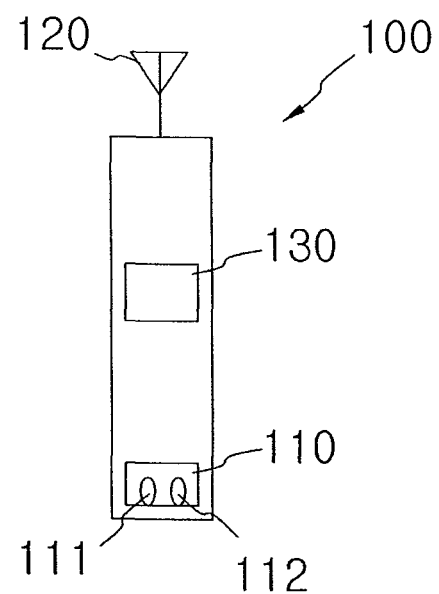
FIG. 10 is a block diagram of a first measuring sensor according to the present invention.

As shown in FIG. 9, the coastal underground water monitoring system according to the present invention includes a freshwater/saltwater interface position tracking device 1, and a first measuring sensor 100 equipped with a first signal output unit 120 (as shown in FIG. 10).

The freshwater/saltwater interface position tracking device 1 is installed in an observation well 2 that is used to observe underground water in the coastal area so that the tracking device 1 can move upward and downward along with the change of the freshwater/saltwater interface 5 according to a change of buoyancy and can measure a change of the position of the freshwater/saltwater interface 5.

Here, the first measuring sensor 100 is installed at a fixed height in the freshwater at a location between an underground water surface 4 and a freshwater/saltwater interface 5, that is, at a location above the freshwater/saltwater interface position tracking device 1.

FIG. 10 is a block diagram of the first measuring sensor according to the present invention.

As shown in FIG. 10, the first measuring sensor 100 includes a distance measuring unit 110 that can measure a first distance 'a' between the distance measuring unit, 110 and the freshwater/saltwater interface position tracking device 1. The first measuring sensor 100 further has the first signal output unit 120 that can output a signal indicative of the measured first distance 'a'.

Further, the first measuring sensor 100 includes a water pressure measuring unit 130 that can measure the pressure of freshwater in real time.

Here, the distance measuring unit 110 can be fabricated using any technique that can measure the distance from the freshwater/saltwater interface position tracking device 1 in water. For example, the distance measuring unit may be fabricated using a sound wave generator or a laser generator 111 and a sound wave receiver or a laser receiver 112 so that the sound wave generator 111 can generate a sound wave and the sound wave receiver 112 can detect the sound wave reflected by the freshwater/saltwater interface position tracking device 1, thereby measuring the distance, or the laser generator 111 can generate a laser beam and the laser receiver 112 can detect the laser beam reflected by the freshwater/saltwater interface position tracking device 1, thereby measuring the distance.

Figure 11:
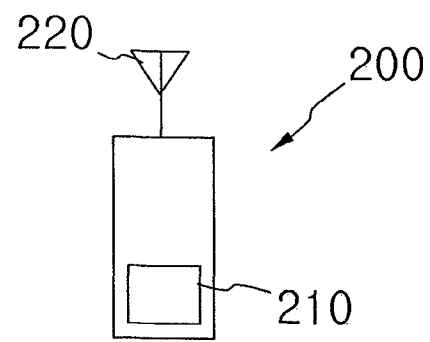
FIG. 11 is a block diagram of a second measuring sensor according to the present invention.

FIG. 11 is a block diagram of a second measuring sensor according to the present invention.

As shown in FIG. 11, the present invention may include a second measuring sensor 200 that is installed in the underground water observation well 2 at a location in air. The second measuring sensor 200 includes an atmospheric pressure measuring unit 210 that can measure the atmospheric pressure and a second signal output unit 220 that can output a signal indicative of data of measured atmospheric pressure.

Due to the atmospheric pressure measuring unit 210, it is possible to monitor a change of the atmospheric pressure inside the underground water observation well 2 in real time.

The measurement of the atmospheric pressure is performed so as to use the measured atmospheric pressure as a compensation value when it is required to measure a change of a freshwater layer thickness between the underground water surface 4 and the freshwater/saltwater interface 5 because the underground water surface 4 minutely changes according to a change of the atmospheric pressure.

Here, the data of the first distance 'a' that was measured by the first measuring sensor 100 is outputted by the first signal output unit 120 and the atmospheric pressure data that was measured by the second measuring sensor 200 is outputted by the second signal output unit 220, so that the monitor 300 can monitor the freshwater lens thickness and/or the freshwater/saltwater interface depth.

Here, the freshwater lens thickness is a sum of the first distance 'a' that is a distance between the first measuring sensor 100 and the freshwater/saltwater interface position tracking device 1 which floats in the freshwater/saltwater interface 5, and a second distance 'b' that is a distance between the underground water surface 4 and the first measuring sensor 100.

Here, although the first measuring sensor 100 is installed at a fixed height, the second distance 'b' can be determined by compensating the distance between the underground water surface 4 and the first measuring sensor 100 using both the atmospheric pressure change and the water pressure that was measured by the water pressure measuring unit 130 of the first measuring sensor 100 because the underground water surface 5 can change according to the atmospheric pressure and the change of the underground water surface 4 can be calculated as a change of the water pressure.

Further, the freshwater/saltwater interface depth means a distance between the ground surface of the underground water observation well 2 and the freshwater/saltwater interface 5, and this depth can be determined by adding the sum of the first distance 'a' and the second distance 'b' to a distance 'c' between the underground water surface 4 and the ground surface that extends to the inlet of the underground water observation well 2.

Here, the position of the initial underground water surface 4 can be determined by measuring a distance when the water surface measuring sensor 400 comes into contact with the underground water surface 4 during an operation of lowering the water surface measuring sensor 400 into the underground water observation well 2. Thereafter, the change of the underground water surface 4 can be calculated based on the initial underground water surface 4 using the change of the water pressure that has been measured by the water pressure measuring unit 130.

Figure 12:
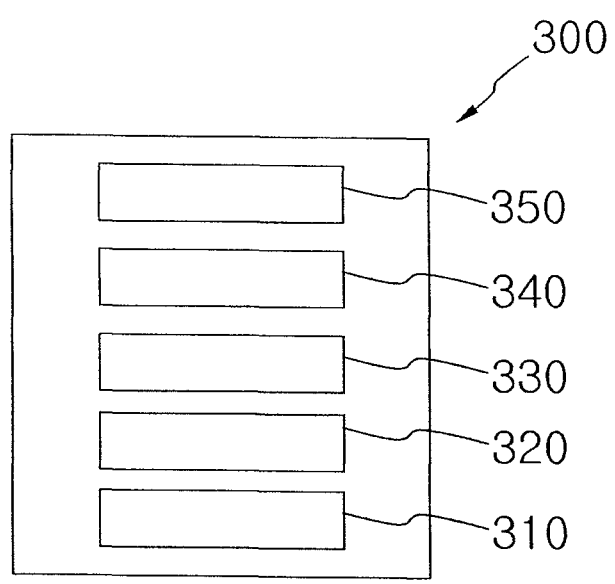
FIG. 12 is a block diagram of a monitor according to the present invention.

FIG. 12 is a block diagram of a monitor according to the present invention.

As shown in FIG. 12, the monitor 300 according to the present invention includes an alarm unit 350 that can raise an alarm when the freshwater lens thickness or the freshwater/saltwater interface depth becomes a value which is less than a preset value P that was preset by a user.

Further, the monitor 300 can calculate the sea level altitude of the ground surface 6 of the underground water observation well 2 using an altitude above the sea water surface 3. Here, the sea level altitude of the freshwater/saltwater interface 5 can be calculated by subtracting the first distance 'a', the second distance 'b' and the third distance 'c' from the sea level altitude of the ground surface 6 of the underground water observation well. When the sea level altitude of the freshwater/saltwater interface 5 increases to be greater than a reference preset value P1, the underground water level of the underground water observation well 2 decreases by the increasing amount of the sea level altitude of the freshwater/saltwater interface 5. Here, the increase in the sea level altitude of the freshwater/saltwater interface 5 means that the saltwater level increases so that the system gives an alarm for managing the underground water.

Here, the alarm unit 350 may be a variety of alarm units, such as a voice alarm unit or a lamp alarm unit, capable of giving the alarm to a user.

Described in more detail, in order to raise an alarm using the alarm unit 350, the monitor 300 includes: a data base 310 which receives and stores the data of both the first distance 'a' and the water pressure that were measured by the first measuring sensor 100 and were outputted by the first signal output unit 120 of the first measuring sensor 100 and the data of the atmospheric pressure that was measured by the atmospheric pressure measuring unit of the second measuring sensor 200 and was outputted by the second signal output unit 220 of the second measuring sensor 200; a data operation unit 320 which can determine the freshwater lens thickness and/or the freshwater/saltwater interface depth using a variety of data stored in the data base 310; a compare unit 330 which can compare the calculated values with preset values, that is, the compare unit 330 can compare the freshwater lens thickness value with the preset value P that was preset by the user or compare the freshwater/saltwater interface depth value with the reference preset value P1 that was preset by the user; and the alarm unit 350 which can raise an alarm when the compare unit 330 determines that the freshwater lens thickness value is less than the preset value P or the freshwater/saltwater interface depth value is greater than the reference preset value P1.

When the data operation unit 320 determines the freshwater lens thickness value or the freshwater/saltwater interface depth value, the data operation unit 320 can monitor the change of the underground water surface 4, which is measured by the water surface measuring sensor 400, in real time while compensating the underground water surface 4 using both the water pressure value that is measured by the water pressure measuring unit 130 of the first measuring sensor 100 and the atmospheric pressure value that is measured by the atmospheric pressure measuring unit 310 of the second measuring sensor 200, thereby determining the second distance 'b' between the underground water surface 4 and the fixed first measuring sensor.

Further, the freshwater lens thickness can be determined using the sum of the first distance 'a', the second distance 'b' and the third distance 'c', and the freshwater/saltwater interface depth value can be determined using differences between the sea level altitude of the ground surface and the distances.

Further, the monitor 300 can display a variety of data, which is stored in the data base 310, and the freshwater lens thickness value or the freshwater/saltwater interface depth value, which is determined by the data operation unit 320, on a display unit 340 in real time, thereby allowing a user to monitor the data and values by eye.

Figure 13:
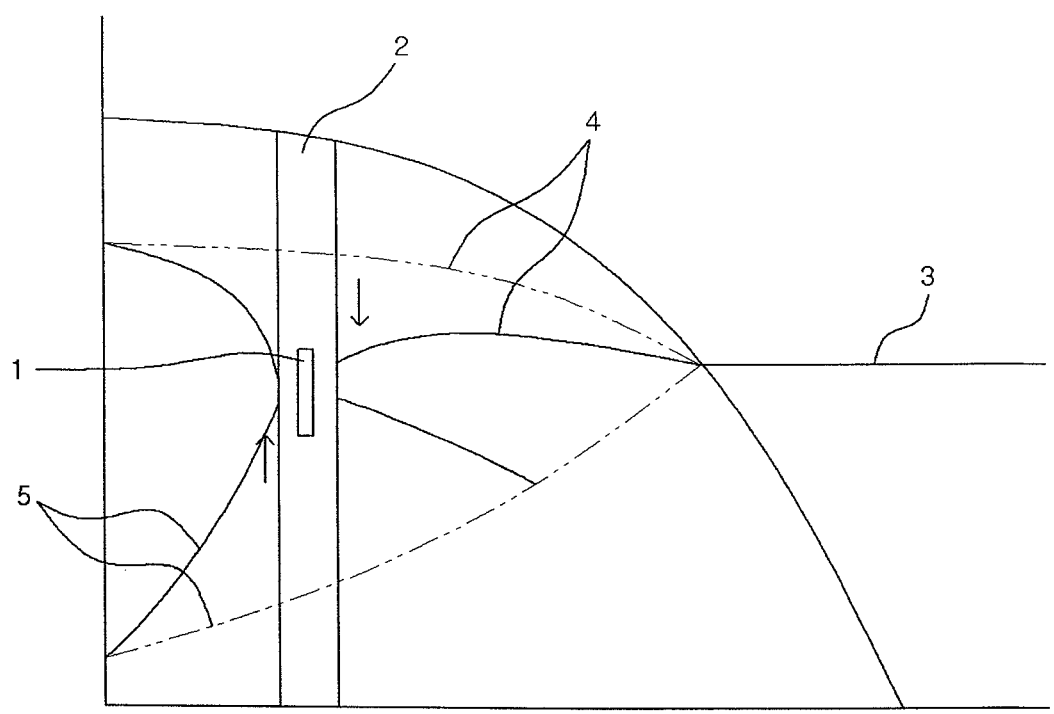
FIG. 13 is a view illustrating a change of the underground water surface and a change of the freshwater/saltwater interface according to use of underground water.

When the freshwater lens thickness value or the freshwater/saltwater interface depth value is less than the preset value P, this means that, first, the amount of rain water that has been naturally added to underground water is reduced due to a long drought, so that the freshwater lens thickness becomes thin and the saltwater thickness becomes thick and, accordingly, the freshwater/saltwater interface 5 raises and users cannot effectively pump freshwater from underground, second, underground water has been excessively pumped from underground water wells in the coastal area, so that the underground water surface 4 decreases in the form of a conical shape in each underground water well and the freshwater/saltwater interface increases in the form of a conical shape and, accordingly, the freshwater/saltwater interface is located at a position above a preset depth. Such raising of the freshwater/saltwater interface due to water pumping is shown in FIG. 13, which illustrates changes of underground water surface 4 and the freshwater/saltwater interface 5 in the underground water observation well 2.

Figure 14:
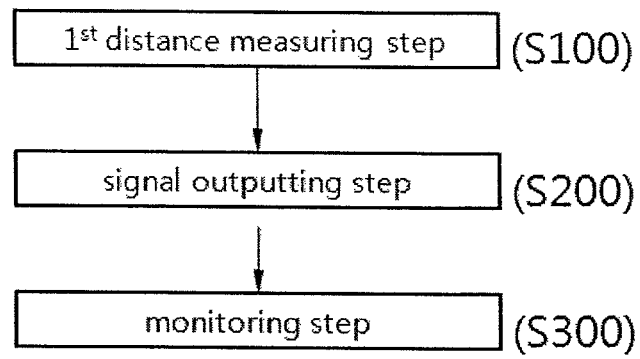
FIG. 14 is a flowchart of a method of monitoring coastal underground water according to an embodiment of the present invention.

FIG. 14 is a flowchart illustrating a method of monitoring coastal underground water according to the present invention.

As shown in FIG. 14, the method of monitoring coastal underground water according to the present invention uses a coastal underground water monitoring system which includes a freshwater/saltwater interface position tracking device 1 that is inserted into an observation well 2 used for observing coastal underground water and can move on a freshwater/saltwater interface 5 according to a change of buoyancy; and a first measuring sensor 100 that is inserted into the observation well 2 so as to be placed at a position above the freshwater/saltwater interface position tracking device 1 and has a distance measuring unit 110 used for measuring a first distance 'a' between the freshwater/saltwater interface position tracking device 1 and the first measuring sensor 100, wherein first measuring sensor 100 has a first signal output unit 120 used for outputting a signal indicative of the first distance 'a' measured by the first measuring sensor 100. The monitoring method includes: a first distance measuring step S100 in which the first distance 'a' between the first measuring sensor 100 and the freshwater/saltwater interface position tracking device 1 is measured; a signal outputting step S200 in which a signal indicative of the measured first distance 'a' is outputted to the monitor 300 by the first signal output unit 120 after the first distance measuring step S100; and a monitoring step S300 in which a change of the freshwater lens thickness or of the freshwater/saltwater interface depth is monitored using transmitted data.

Figure 15:
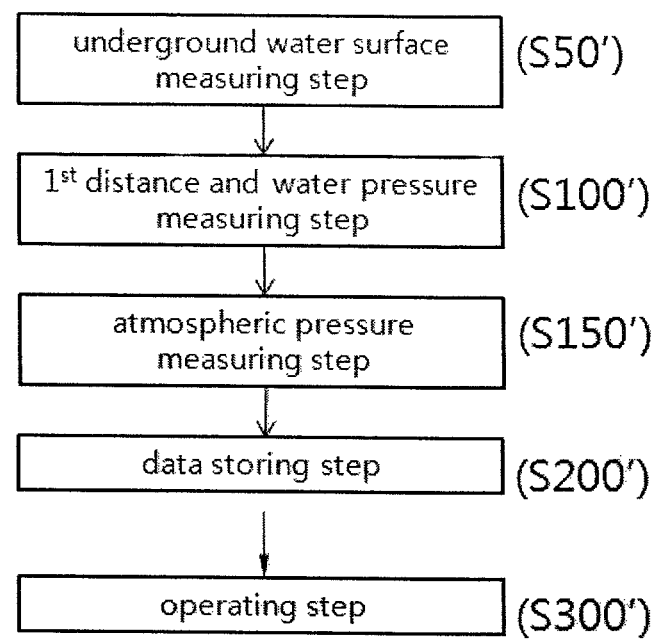
FIG. 15 is a flowchart of a method of monitoring coastal underground water according to another embodiment of the present invention.

FIG. 15 is a flowchart illustrating a method of monitoring coastal underground water according to another embodiment of the present invention.

As shown in FIG. 15, the method of monitoring coastal underground water according to the other embodiment of the present invention uses a coastal underground water monitoring system which includes: a freshwater/saltwater interface position tracking device 1 that is inserted into an observation well 2 used for observing coastal underground water and can move on a freshwater/saltwater interface 5 according to a change of buoyancy; a first measuring sensor 100 that is inserted into the observation well 2 so as to be placed at a position above the freshwater/saltwater interface position tracking device 1 and has a distance measuring unit 110 used for measuring a first distance 'a' between the freshwater/saltwater interface position tracking device 1 and the first measuring sensor 100 and has a water pressure measuring unit 130 used for measuring water pressure; a second measuring sensor 200 that has an atmospheric pressure measuring unit 210 used for measuring the atmospheric pressure; a water surface measuring sensor 400 used for measuring an underground water surface 4; and a monitor 300 that includes: a data base 310 used for storing data measured by the first measuring sensor 100, data measured by the second measuring sensor 200 and data measured by the water surface measuring sensor 400; a data operation unit 320 used for operating the data stored in the data base 310; a compare unit 330 used for comparing the value operated by the data operation unit 320 with a preset value P so as to determine whether the operated value is less that the preset value P; and an alarm unit 350 used for raising an alarm when the compare unit 330 determines that the freshwater lens thickness value is less than the preset value P or the freshwater/saltwater interface depth value is greater than a reference preset value P1. The monitoring method includes: an underground water surface measuring step S50' in which the underground water surface 4 is measured using the water surface measuring sensor 400; a first distance and water pressure measuring step S100' in which the first distance 'a' between the first measuring sensor 100 and the freshwater/saltwater interface position tracking device 1 is measured and the water pressure is measured; an atmospheric pressure measuring step S150' in which the atmospheric pressure is measured by the atmospheric pressure measuring unit 210 of the second measuring sensor 200; a data storing step S200' in which the measured data is stored in the data base 310; and an operating step S300' in which the distance between the underground water surface 4 and the first measuring sensor 100 is compensated using both the atmospheric pressure and the water pressure and is added to the first distance 'a', thereby determining the freshwater lens thickness.

Although the embodiments of the present invention have been disclosed for illustrative purposes, those skilled in the art will appreciate that various modifications, additions and substitutions are possible, without departing from the scope and spirit of the invention as disclosed in the accompanying claims.

The system for monitoring coastal underground water according to the present invention ins some of its various embodiments is advantageous in that it can observe the freshwater/saltwater interface in real time and measure a change of the freshwater lens thickness or a change of the depth of the freshwater/saltwater interface so that, when there may be a danger of sea water intrusion in a coastal aquifer, the system can raise an alarm for restricting the use of underground water, thereby easily managing the coastal underground water.

The invention claimed is:

1. A system for monitoring coastal underground water, comprising:
   a freshwater/saltwater interface position tracking device that is inserted into an observation well used for observing coastal underground water and can move on a freshwater/saltwater interface according to a change of buoyancy; and
   a first measuring sensor that is inserted into the observation well so as to be placed at a position above the freshwater/saltwater interface position tracking device and has a distance measuring unit used for measuring a first distance between the freshwater/saltwater interface position tracking device and the first measuring sensor,
   and
   a second measuring sensor inserted into the observation well so as to be placed in air, wherein the first measuring sensor has a first signal output unit used for outputting a signal indicative of the measured first distance,
   wherein the first measuring sensor includes a water pressure measuring unit used for measuring a water pressure,
   wherein the second measuring sensor includes an atmospheric pressure measuring unit used for measuring atmospheric pressure, and
   wherein the second measuring sensor includes a second signal output unit used for outputting data of the measured atmospheric pressure,
   wherein a freshwater/saltwater interface position tracking device, comprising a buoyancy inducing unit comprising a pipe having an internal space, the buoyancy inducing unit being closed on a lower end thereof;
   a sealing cap removably coupled to an upper end of the buoyancy inducing unit;
   a variable metal member attached to a top of the sealing cap wherein the variable metal member includes multiple metal blades arranged in the horizontal plane defined by the top of the sealing cap and wherein the multiple metal blades are to be folded or unfolded in a circumferential direction so that the size of the variable metal member is extendable or contractible depending on a diameter of the underground water monitoring well.

2. The system for monitoring coastal underground water as set forth in claim 1, wherein the distance measuring unit includes a sound wave generator and a sound wave receiver or a laser generator and a laser receiver.

3. The system for monitoring coastal underground water as set forth in claim 1, further comprising:
   a monitor used for monitoring a freshwater lens thickness or a freshwater/saltwater interface depth using both data outputted from the first signal output unit and data outputted from the second signal output unit.

4. The system for monitoring coastal underground water set forth in claim 3, wherein the monitor includes an alarm unit used for raising an alarm when the freshwater lens thickness is less than a preset value or the freshwater/saltwater interface depth is greater than the reference preset value.

5. A system for monitoring coastal underground water, comprising:
   a freshwater/saltwater interface position tracking device that is inserted into an observation well used for observing coastal underground water and can move on a freshwater/saltwater interface according to a change of buoyancy;
   a first measuring sensor that is inserted into the observation well so as to be placed at a position above the freshwater/saltwater interface position tracking device and includes a distance measuring unit used for measuring a first distance between the freshwater/saltwater interface position tracking device and the first measuring sensor and includes a water pressure measuring unit used for measuring water pressure;
   a second measuring sensor including an atmospheric pressure measuring unit used for measuring atmospheric pressure;
   a water surface measuring sensor used for measuring an underground water surface; and
   a monitor that includes: a data base used for storing data measured by the first measuring sensor, data measured by the second measuring sensor and data measured by the water surface measuring sensor; a data operation unit used for operating the data stored in the data base; a compare unit used for comparing a value operated by the data operation unit with a preset value; and an alarm unit used for raising an alarm when the compare unit determines that the value operated by the data operation unit is less than the preset value,
   wherein the data operation unit determines a second distance between the underground water surface and the first measuring sensor, which was measured by the water surface measuring sensor, using both the water pressure measured by the water pressure measuring unit of the first measuring sensor and the atmospheric pressure measured by the second measuring sensor, and determines a freshwater lens thickness by adding the first distance to the second distance,
   wherein a freshwater/saltwater interface position tracking device, comprising:
   a buoyancy inducing unit comprising a pipe having an internal space, the buoyancy inducing unit being closed on a lower end thereof;
   a sealing cap removably coupled to an upper end of the buoyancy inducing unit;
   a variable metal member attached to a top of the sealing cap wherein the variable metal member includes multiple metal blades arranged in the horizontal plane defined by the top of the sealing cap and wherein the multiple metal blades are to be folded or unfolded in a circumferential direction so that the size of the variable metal member is extendable or contractible depending on a diameter of the underground water monitoring well.

6. The system for monitoring coastal underground water as set forth in claim 5, wherein the data operation unit determines a second distance between the underground water surface and the first measuring sensor, which was measured by the water surface measuring sensor, using both the water pressure measured by the water pressure measuring unit of the first measuring sensor and the atmospheric pressure measured by the second measuring sensor, and determines a freshwater lens thickness by adding the first distance to the second distance.

* * * * *